April 23, 1935.  S. SMITH  1,998,528
VEHICLE
Original Filed Oct. 12, 1933   3 Sheets-Sheet 1
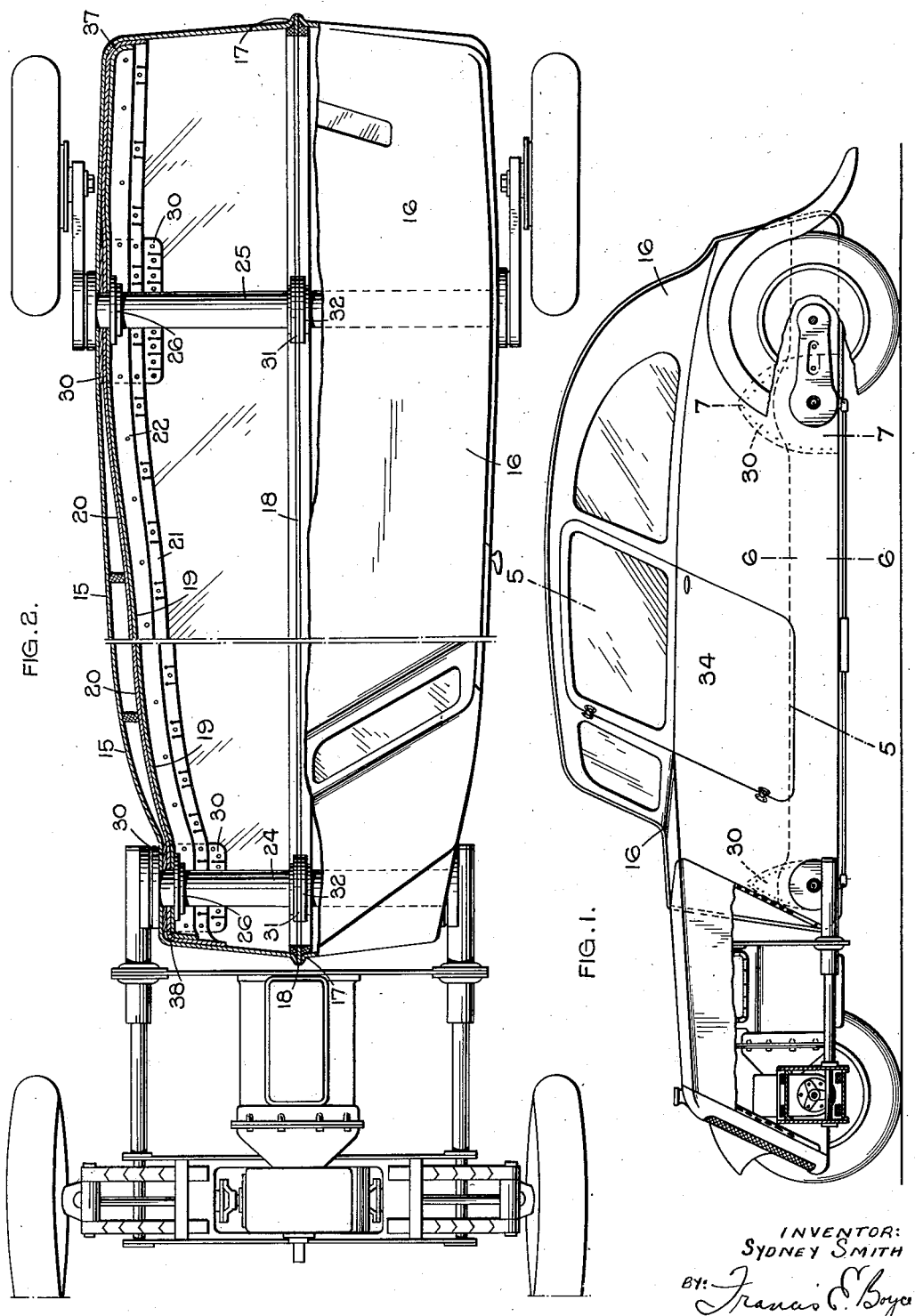
INVENTOR:
SYDNEY SMITH
BY: Francis E. Boyce
ATTORNEY April 23, 1935.  S. SMITH  1,998,528
VEHICLE
Original Filed Oct. 12, 1933  3 Sheets-Sheet 3
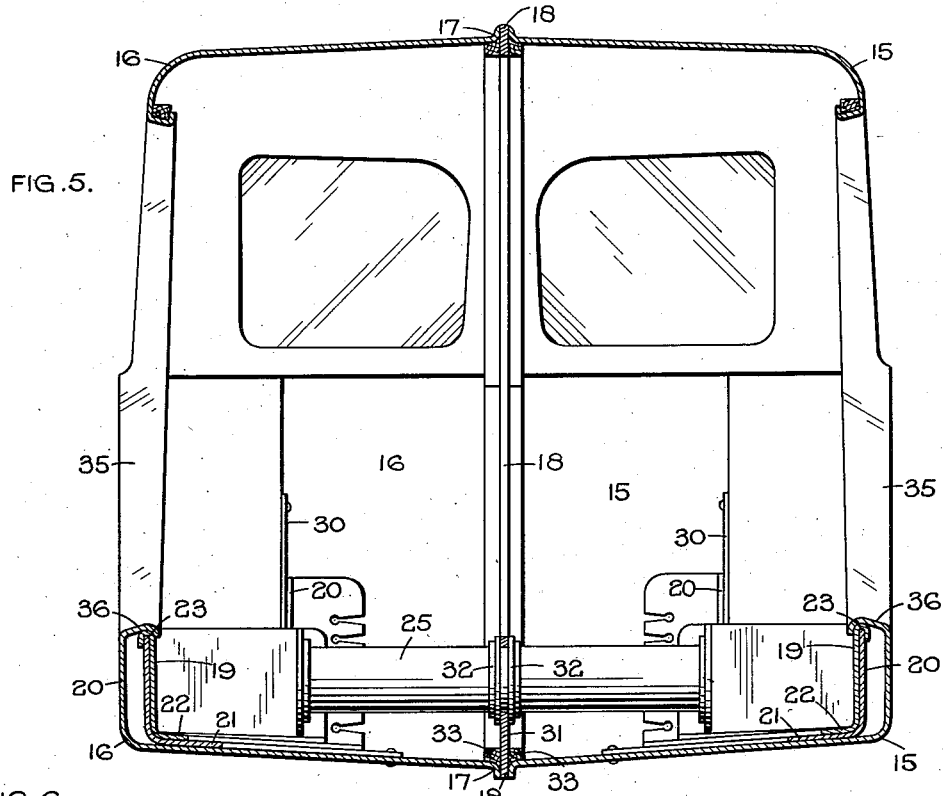
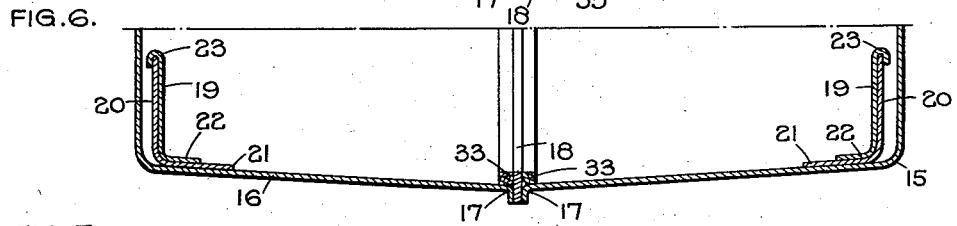
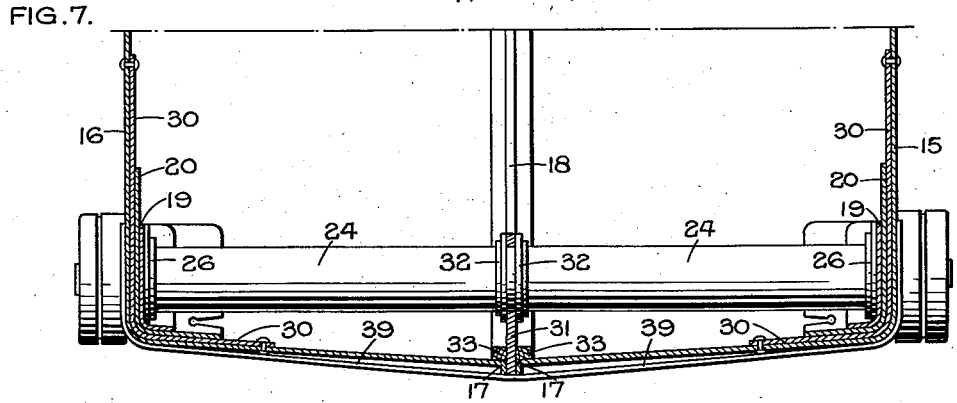
INVENTOR:
SYDNEY SMITH
BY: Francis E. Boyce
ATTORNEY Patented Apr. 23, 1935

1,998,528

UNITED STATES PATENT OFFICE 1,998,528

VEHICLE

Sydney Smith, Chobham, England

Original application October 12, 1933, Serial No. 693,290. Divided and this application March 16, 1934, Serial No. 715,859. In Great Britain October 14, 1932

16 Claims. (Cl. 296—28)

This invention relates to improvements in vehicles, particularly automobile vehicles of the saloon type.

The object of the invention is to provide an improved form of body enabling the weight to be reduced by dispensing with the supporting frame to which the wheels are normally attached and by which the body is carried, the present invention providing a body shell of sufficient strength and rigidity to allow the supporting frame to be dispensed with being a division of application Serial No. 693,290, filed October 12, 1933.

Referring to the drawings:—

Figure 1 shows partly in section a vehicle constructed according to the present invention.

Figure 2 is a plan view of same partly in section and with the radiator engine cover removed.

Figure 5 is a transverse section on line 5—5 of Figure 1.

Figure 6 is a part section on line 6—6 of Figure 1.

Figure 7 is a part section on line 7—7 of Figure 1.

Figure 3:
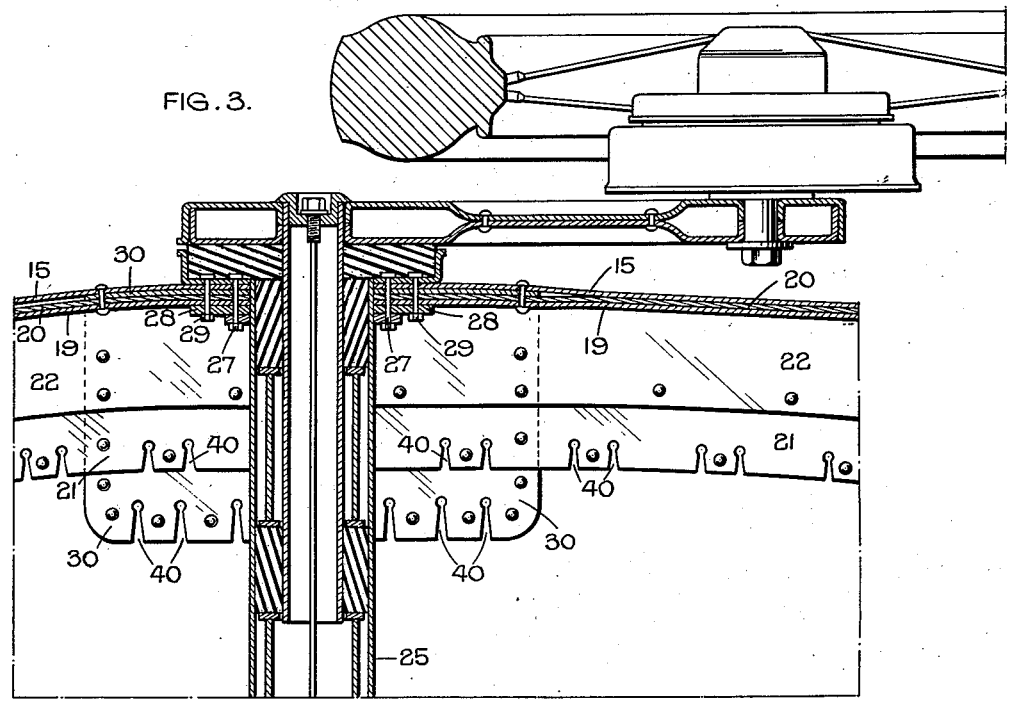
Figure 3 is a sectional view showing the construction of the springing of the rear wheels.

In the application of this invention illustrated in the drawings accompanying this specification, the body shell is constructed from two sheet metal pressings 15, 16 of similar shape but of opposite hand, each pressing being outwardly flanged at its peripheral edge as at 17, and the pressings being secured together to form the body shell.

A backbone strip 18 is secured between the flanges 17 by welding, and if desired by riveting, this backbone strip being preferably formed from sheet metal and being in a single piece extending entirely around the vertical section of the body shell or in a number of suitable sections.

This backbone stiffens and strengthens the body shell in a longitudinal direction and strengthens the joint between the two pressings 15 and 16.

The body is reinforced at its lower part by means of longitudinally extending reinforcement members disposed one adjacent each of the vertical longitudinal walls of the body, the lower edge of the plate being secured to the base of the body.

Each reinforcement member comprises two plates 19 and 20 disposed vertically side by side as shown in Figures 5 to 7, the plates being bent inwardly at their lower part, and the outer plate 20 being of greater width than the inner plate 19 so that the turned under portion 21 of the plate 20 projects beyond the turned under portion 22 of the plate 19 and the thickness of the reinforcement member is stepped from the side wall towards the longitudinal centre of the body.

The portion 21 of the outer plate 20 is secured at its lower part to the base of the body and to the portion 22 of the plate 19 by welding or by spot welding, and the upper edge of the plate 19 is bent over the upper edge of the plate 20 as shown at 23 in Figures 5 and 6.

A transverse tube 24 is secured between the side walls of the body shell at the rear thereof, and a further transverse tube 25 is provided at the front of the body shell, and at the positions at which such transverse tubes are secured the longitudinal reinforcement members extend in close proximity to the interior of the side wall of the body, but being spaced from the side wall between such positions as shown in the sectional plan illustrated in Figure 2.

Each transverse tube is flanged at 26 adjacent each end, and these flanges and the longitudinal reinforcement members are united to the side wall of the body by bolts 27.

The thickness of each flange 26 decreases towards its outer edge by forming each flange of two co-axial annular plates 26 and 28, the outer plate of larger diameter being secured by bolts 29.

Figure 4:
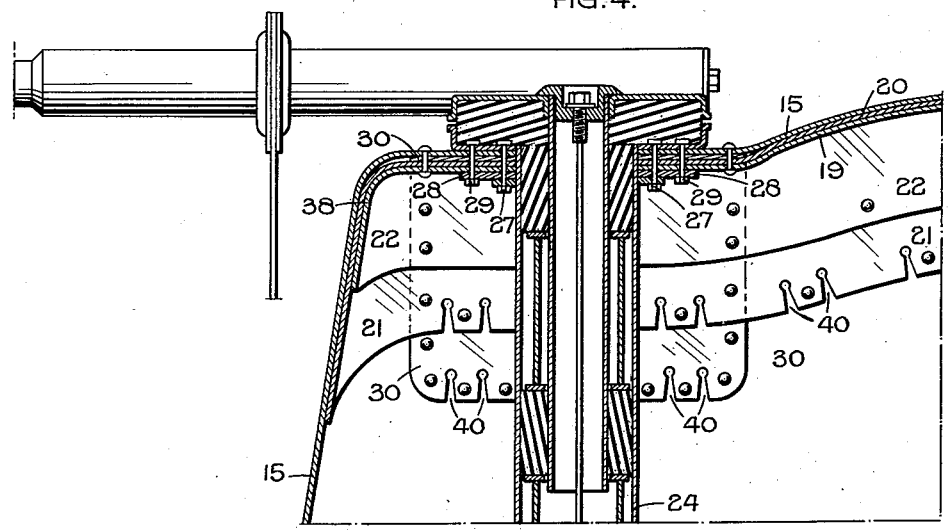
Figure 4 is a detail showing the attachment of the front wheel spring to the body shell.

Further reinforcement plates 30 of ovoid shape are inserted between the interior of the body and the outer plate 20 of each reinforcement member at the positions at which the transverse tubes 24 and 25 are secured, and the load is transferred to the sides of the body over a large area through weakened tongues of metal at the edge of the plates as shown in Figures 3 and 4.

These plates are clamped in position by the bolts 27 and 29, and in addition are riveted or spot welded to the body shell and to the reinforcement members.

The body is suspended from the road wheels acting between the body and arms associated with the wheels but the wheel suspension of the body forms no part of the present invention and forms the subject of my copending application serially numbered 693,258.

The backbone strip 18 is constructed with integral lugs 31 at the positions at which the transverse tubes 24 and 25 extend. Each transverse tube extends through an aperture in the corresponding lug 31 and is provided with flanges 32 disposed one on either side of and secured to the lug 31 as shown in Figures 5 and 7.

Thus the transverse tubes are anchored with respect to the backbone of the body shell and the structure is strengthened and stiffened.

Strips 33 of wood are secured one on either side of the backbone strip 18 and serve for the attachment of internal fittings or accessories.

At each side of the body there is provided a door 34 and at the door opening the metal of the body shell is flanged inwardly at 35 to form the seat for the edges of the door.

The principle is the same if there are two doors per side.

At the lower edge of the door opening the flange 36 bridges the gap between the side wall of the body shell and the reinforcement member, over the upper edge of which latter the flange 36 is turned. The flange is secured to the reinforcement member by welding, riveting or bolting, and the box-like section thus formed at the lower side of the door gives an extremely rigid construction.

The reinforcement plates 19 and 20 are bent around the rear of the body shell as at 37 and around the front of the body as at 38 to strengthen the front and rear corners of the body.

One or more transverse straps 39 are provided beneath the base of the body shell, being secured thereto by welding, riveting, or in any other suitable manner.

The body shell is strengthened by the longitudinal reinforcement members or plates and the laminated construction of such members increases the strength and allows the stepped joint to the body, so that the additional strength is provided gradually with no rapid change in section, and loading is distributed better to the body shell.

The slots 40 in the edge of the plates 20 and 30 provide weakened tongues of metal, at the junction with the body shell, and through which the load is transferred from the plates to the body shell, so that the load is distributed over a wide area and since the resilient tongues would fail before the body shell, the possibility of fracture of the latter is minimized.

The longitudinal backbone strip 18 also strengthens and stiffens the body shell and improves the joint between the pressings 15 and 16 thereof, whilst the transverse tubes 24 and 25, which stiffen the lower portion of the body shell in addition to housing the road wheel suspending means, are keyed to this backbone strip by engagement with the lugs 31.

Further the reinforcement plates 19 and 20 add considerable strength along the lower edges of the body and stiffen up the bottom of the vehicle as well as the lower corners at the front and rear of the body.

What I claim is:—

1. A vehicle body of the saloon type including a body shell, sheet metal sides to said shell, a sheet metal base to said shell, reinforcement plates extending longitudinally at each side of the body, said reinforcement plates being disposed on edge within said body shell near the base thereof, and transverse members secured between said reinforcement plates, said plates and said transverse members stiffening and strengthening the lower portion of the body shell at which it is adapted to be supported on the road wheels.

2. A vehicle body of the saloon type including a body shell, reinforcement plates extending longitudinally at each side of the body, said reinforcement plates being disposed on edge within said body shell near the base thereof, each of said plates being secured along its lower horizontal edge to said body shell and transverse members between the ends of said reinforcement plates, said plates and said transverse members stiffening and strengthening the lower portion of the body shell at which it is adapted to be supported on the road wheels.

3. A vehicle body of the saloon type including a body shell, sheet metal sides to said shell, a sheet metal base to said shell, reinforcement plates extending longitudinally at each side of the body, said reinforcement plates being disposed on edge within said body shell near the base thereof, each of said plates being secured along its lower horizontal edge to said body shell, a transversely extending member at the front and rear of said body, each reinforcement plate being spaced from the side wall of said body shell intermediate the positions of said transverse members, said body shell having a door opening in said side wall, an inwardly extending flange at the lower side of said opening, said flange extending to the upper edge of said reinforcement plate to bridge the space between said plate and the said wall.

4. A vehicle body of the saloon type including a body shell, reinforcement plates extending longitudinally at each side of the body, said reinforcement plates being disposed on edge within said body shell near the base thereof, each of said plates being secured along its lower horizontal edge to said body shell, a transversely extending tube at the front and rear of said body, and each reinforcement plate being secured between the interior of said body shell and flanges on said transverse tubes, said plates and said transverse members stiffening and strengthening the lower portion of the body shell at which it is adapted to be supported on the road wheels.

5. A vehicle body of the saloon type including a body shell, reinforcement plates extending longitudinally at each side of the body, said reinforcement plates being disposed on edge within said body shell near the base thereof, each of said plates being secured along its lower horizontal edge to said body shell, a transversely extending tube at the front and rear of said body, each reinforcement plate being secured between the interior of said body shell and flanges on said transverse tubes, and being spaced from said body shell intermediate the positions of said tubes, said body shell having a door opening in said side wall, an inwardly extending flange at the lower side of said opening, said flange extending to the upper edge of said reinforcement plate to bridge the space between said plate and the said wall.

6. A vehicle body of the saloon type including a body shell, sheet metal sides to said shell, a sheet metal base to said shell, reinforcement plates extending longitudinally at each side of the body, said reinforcement plates being disposed on edge within said body shell near the base thereof, a portion of said plate extending along the base of said shell and being secured thereto to stiffen the lower horizontal edge of said shell, a transversely extending member at the front and rear of said body, each reinforcement plate being spaced from the side wall of said body shell intermediate the positions of said transverse members, said body shell having a door opening in said side wall, an inwardly extending flange at the lower side of said opening, said flange extending to the upper edge of said reinforcement plate to bridge the space between said plate and the said wall.

7. A vehicle body of the saloon type including a body shell, sheet metal sides to said shell, a sheet metal base to said shell, reinforcement plates extending longitudinally at each side of the body, said reinforcement plates being disposed on edge within said body shell near the base thereof, each reinforcement plate being of stepped thickness in transverse section, a transversely extending member at the front and rear of said body, each reinforcement plate being spaced from the side wall of said body shell intermediate the positions of said transverse members, said body shell having a door opening in said side wall, an inwardly extending flange at the lower side of said opening, said flange extending to the upper edge of said reinforcement plate to bridge the space between said plate and the said wall.

8. A vehicle body of the saloon type including a body shell, sheet metal sides to said shell, a sheet metal base to said shell, reinforcement plates extending longitudinally at each side of the body, said reinforcement plates being disposed on edge within said body shell near the base thereof, each reinforcement plate being of stepped thickness in transverse section, a portion of said plate extending along the base of said shell and being secured thereto to stiffen the lower horizontal edge of said shell, a transversely extending tube at the front and rear of said body, each reinforcement plate being secured between the interior of said body shell and flanges on said transverse tubes and being spaced from said body shell intermediate the positions of said tubes, said body shell having a door opening in said side wall, an inwardly extending flange at the lower side of said opening, said flange extending to the upper edge of said reinforcement plate to bridge the space between said plate and the said wall.

9. A vehicle body of the saloon type having a body shell including a pair of opposed sheet metal pressings of similar shape but of opposite hand, each pressing being continuously flanged around its peripheral edge, and a strengthening strip disposed on edge between and connecting together the flanges on adjacent pressings, said strip extending entirely around said flanges to form a longitudinal backbone rib for said body shell.

10. A vehicle body of the saloon type having a body shell including a pair of opposed sheet metal pressings of similar shape but of opposite hand, each pressing being continuously flanged around its peripheral edge, a strengthening strip disposed between and connecting together the flanges on adjacent pressings, said strip extending entirely around the body shell to form a longitudinal backbone rib therefor, a reinforcement plate disposed on edge and extending longitudinally on the interior of each of said pressings and at the lower portion thereof and each of said reinforcement plates being secured along its lower horizontal edge to said body shell.

11. A vehicle body of the saloon type having a body shell including a pair of opposed sheet metal pressings of similar shape but of opposite hand, integral flanges on each of said pressings, means for connecting said flanges together to form said body shell, a strengthening strip secured between the flanges on adjacent pressings to form a longitudinal backbone rib for said body shell, a transversely extending member at the front and rear of said body shell and at the lower portion thereof, lugs on said backbone strip engaging said transverse members, a reinforcement plate disposed on edge and extending longitudinally on the interior of each of said pressings and at the lower portion thereof, each of said plates being secured between the interior of said body and flanges on said transverse members, and being secured at its lower horizontal edge to said body shell.

12. A frameless motor vehicle of the saloon type having a body shell including a pair of opposed sheet metal pressings of similar shape but of opposite hand, means for connecting said pressings together to form said body shell, road wheels for said body, means for suspending said body from said wheels, a transversely extending member at the front and rear of said body shell and at the lower portion thereof, longitudinally extending reinforcement plates for said body shell, each of said plates being secured between the interior of said body and flanges on said transverse members, said reinforcement plates and said transverse members stiffening and strengthening the body shell and supporting the road wheel suspending means.

13. A frameless motor vehicle of the saloon type having a body shell including a pair of opposed sheet metal pressings of similar shape but of opposite hand, means for connecting said pressings together to form said body shell, road wheels for said body, means for suspending said body from said wheels, a transversely extending member at the front and rear of said body shell and at the lower portion thereof, longitudinally extending reinforcement plates for said body shell, each of said plates being secured between the interior of said body and flanges on said transverse members and being secured at its lower horizontal edge to said body shell, said reinforcement plates being spaced from the wall of said body shell intermediate the positions of said members, the side wall of said body being flanged inwardly at the door opening in the body, and the flanged portion at the lower side of said opening extending to the upper edge of said reinforcement plate to bridge the space between said plate and the said wall.

14. In a vehicle the construction of a body having tubes extending transversely of the body at the lower part and above the bottom thereof, reinforcement members extending longitudinally at each side of the body and secured between the interior of the side wall of the body and flanges on said transverse tubes, and each of said reinforcement members being united at its lower edge to the bottom of the body.

15. In a vehicle the construction of a body having tubes extending transversely of the body at the lower part and above the bottom thereof, reinforcement members extending longitudinally at each side of the body and secured between the interior of the side wall of the body and flanges on said transverse tubes, and each reinforcement member being bent under to extend across the bottom of the body to which the reinforcement member is secured at its lower edge.

16. In a vehicle the construction of a body having tubes extending transversely of the body at the lower part and above the bottom thereof, reinforcement members extending longitudinally at each side of the body and secured between the interior of the side wall of the body and flanges on said transverse tubes, each reinforcement member comprising a plurality of metal sheets of different widths to distribute the load over the surface of the body and each reinforcement member being bent under to extend across the bottom of the body to which the reinforcement member is secured at its lower edge.

SYDNEY SMITH.